United States Patent
Passley (10) Patent No.: US 11,970,293 B2
(45) Date of Patent: Apr. 30, 2024

(54) DRONE WITH EXTENDABLE AND ROTATABLE WINGS AND MULTIPLE ACCESSORY SECURING PANEL

(71) Applicant: Shaun Passley, Chicago, IL (US)

(72) Inventor: Shaun Passley, Chicago, IL (US)

(73) Assignee: EPAZZ, INC., Chicago, IL (US)

( * ) Notice: Subject to any disclaimer, the term of this patent is extended or adjusted under 35 U.S.C. 154(b) by 26 days.

(21) Appl. No.: 17/705,310

(22) Filed: Mar. 26, 2022

(65) Prior Publication Data

US 2023/0303272 A1   Sep. 28, 2023

(51) Int. Cl.
| | |
|---|---|
| *B64U 20/50* | (2023.01) |
| *B64C 3/56* | (2006.01) |
| *B64U 40/10* | (2023.01) |
| *B64C 39/02* | (2023.01) |
| *B64U 30/12* | (2023.01) |
| *B64U 30/20* | (2023.01) |
| *B64U 70/80* | (2023.01) |
| *B64U 101/30* | (2023.01) |

(52) U.S. Cl.
CPC .............. *B64U 20/50* (2023.01); *B64C 3/56* (2013.01); *B64U 40/10* (2023.01); *B64C 39/024* (2013.01); *B64U 30/12* (2023.01); *B64U 30/20* (2023.01); *B64U 70/80* (2023.01); *B64U 2101/30* (2023.01)

(58) Field of Classification Search
CPC ............ B64U 20/50; B64U 40/10; B64C 3/56
See application file for complete search history.

(56) References Cited

U.S. PATENT DOCUMENTS

| | | | | |
|---|---|---|---|---|
| 10,155,585 | B2 * | 12/2018 | Johannesson | ............ B64C 27/50 |
| 2004/0026564 | A1 * | 2/2004 | Romani | ................... B64C 27/50 |
| | | | | 244/17.11 |
| 2014/0084114 | A1 * | 3/2014 | Valentin | .................. B64C 27/28 |
| | | | | 244/7 R |
| 2016/0311528 | A1 * | 10/2016 | Nemovi | ................... B64C 27/82 |
| 2018/0281933 | A1 * | 10/2018 | Davis | ...................... B64C 25/12 |
| 2019/0016435 | A1 * | 1/2019 | Nysæter | .................... B64C 1/30 |
| 2019/0023392 | A1 * | 1/2019 | Micros | .................. B64C 33/025 |
| 2019/0321971 | A1 * | 10/2019 | Bosworth | .............. B25J 9/1065 |
| 2021/0053677 | A1 * | 2/2021 | Passley | .................. B64U 10/13 |

* cited by examiner

*Primary Examiner* — Jessica B Wong
(74) *Attorney, Agent, or Firm* — Justin Lampel (57) ABSTRACT

A drone with extendable and rotatable wings and a multiple accessory securing panel is provided. The extendable wings help increase the lift of the drone and reduce the air drag on the drone. The multiple accessory securing panel allows various tools and objects to be temporarily and selectively secured to the drone. The multiple accessories may be secured to the drone by a ground based rotating delivery unit. The drone may have a removable front nose and legs which receive power from a power unit.

14 Claims, 15 Drawing Sheets

DRONE WITH EXTENDABLE AND ROTATABLE WINGS AND MULTIPLE ACCESSORY SECURING PANEL

BACKGROUND OF THE INVENTION

A drone with extendable and rotatable wings and a multiple accessory securing panel is provided. The extendable wings help increase the lift of the drone and reduce the air drag on the drone. The multiple accessory securing panel allows various tools and objects to be temporarily and selectively secured to the drone. The multiple accessories may be secured to the drone by a ground based rotating delivery unit. The drone may have a removable front nose and legs which receive power from a power unit.

Drones having movable wings are known. For example, U.S. Pat. No. 10,407,168 to Hutson discloses a drone having a landing control device that is configured to rotate wings into an auto-rotation decent configuration causing the drone to enter a nose-down attitude and spin about a long axis of the drone, and to collectively control pivot angles of the wings to enables control of decent rate and lateral motion during an auto-rotation descent. The landing control device may be a landing carousel including a pivotal frame secured to a drone body and configured to rotate about a carousel axis extending laterally relative to a longitudinal axis of the body. The landing carousel may include a first wing motor configured to pivot a first wing about a wing pivot axis extending parallel to the carousel axis, and a second wing motor configured to pivot a second wing about the wing pivot axis independent of the pivot the first wing.

Further, U.S. Pat. No. 10,526,065 to Thomassey discloses a drone having a carrier structure, at least three lift propulsion rotors and a control system delivering at least one electrical power supply to at least three electric motors driving said at least three rotors, said at least three rotors being spaced apart longitudinally and transversely beside one another, wherein said drone includes a wing carrying two half-wings symmetrically about an anteroposterior plane of symmetry P of said drone, serving at least to increase the lift of said drone, each of said two half-wings including at least one movable portion suitable for moving relative to said carrier structure of said drone with at least a first degree of freedom to move in rotation about a first pivot axis parallel to a longitudinal direction X of said drone; and two first electric actuators respectively enabling each of said movable portions of one of said two half-wings.

However, these patents fail to describe a drone having extendable and rotatable wings and a multiple accessory securing panel which is easy to use. Further, these patents fail to describe a drone having extendable and rotatable wings and a multiple accessory securing panel which allows various tools and objects to be temporarily and selectively secured to the drone.

SUMMARY OF THE INVENTION

A drone with extendable and rotatable wings and a multiple accessory securing panel is provided. The extendable wings help increase the lift of the drone and reduce the air drag on the drone. The multiple accessory securing panel allows various tools and objects to be temporarily and selectively secured to the drone. The multiple accessories may be secured to the drone by a ground based rotating delivery unit. The drone may have a removable front nose and legs which receive power from a power unit.

An advantage of the present drone with extendable and rotatable wings and a multiple accessory securing panel is that the present drone is especially suitable for use in farming.

And another advantage of the present drone with extendable and rotatable wings and a multiple accessory securing panel is that the present drone allows for an endless supply of interchangeable tools and objects to be selectively secured to the drone.

Yet another advantage of the present drone with extendable and rotatable wings and a multiple accessory securing panel is that the present drone is highly stable and can maneuver quickly and efficiently.

And an advantage of the present drone is that the present drone may receive various accessory units by means of a ground based rotating delivery unit having rotating pallets.

Another advantage of the present drone is that the present drone may have adjustable legs which may connect to a power unit for supplying power to the drone.

Still another advantage of the present drone is the that present drone may have a removable front nose having a high resolution camera having sensors.

For a more complete understanding of the above listed features and advantages of the present drone assembly and system reference should be made to the detailed description and the detailed drawings. Further, additional features and advantages of the invention are described in, and will be apparent from, the detailed description of the preferred embodiments.

DETAILED DESCRIPTION OF THE PREFERRED EMBODIMENTS

A drone with extendable and rotatable wings and a multiple accessory securing panel is provided. The extendable wings help increase the lift of the drone and reduce the air drag on the drone. The multiple accessory securing panel allows various tools and objects to be temporarily and selectively secured to the drone. The multiple accessories may be secured to the drone by a ground based rotating delivery unit. The drone may have a removable front nose and legs which receive power from a power unit.

Figure 7:
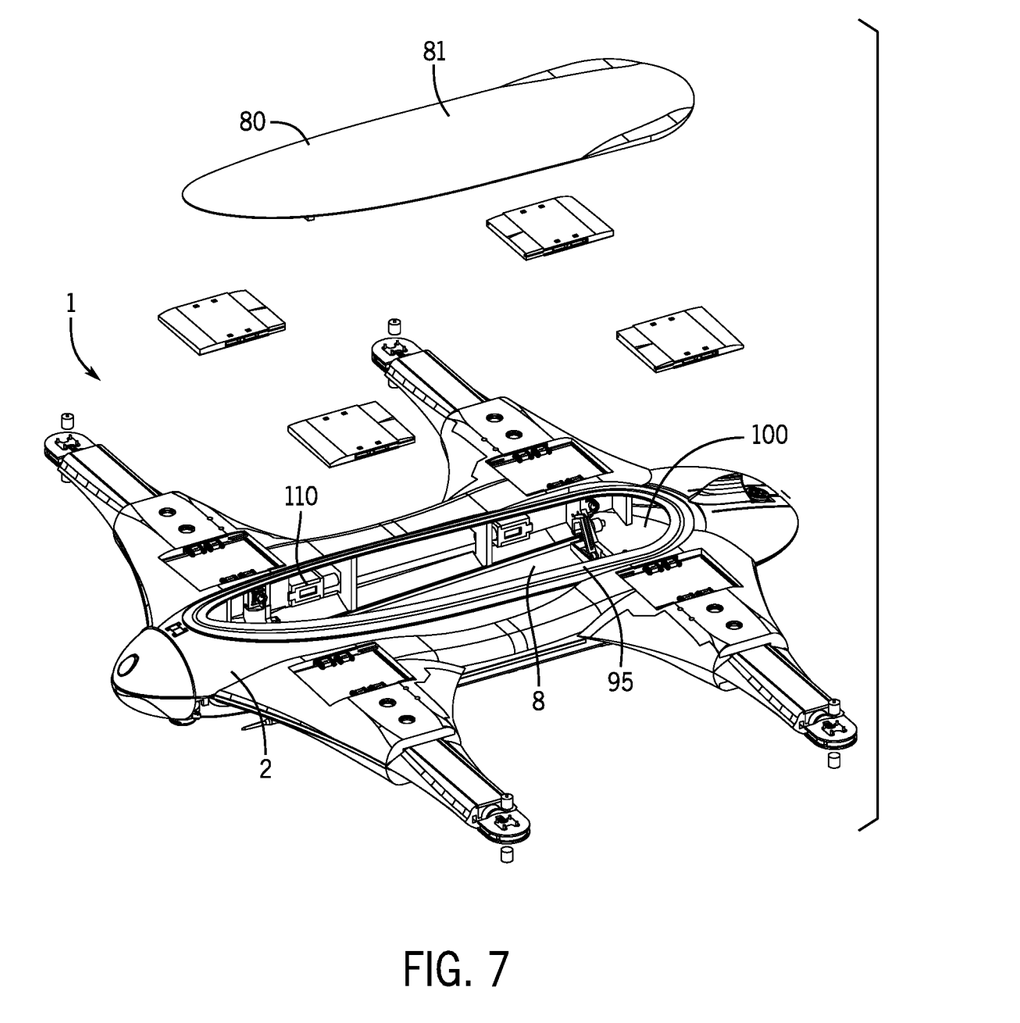
FIG. 7 illustrates an exploded view of the top of the body of the drone wherein the generally hollow interior of the drone is visible.
Figure 8:
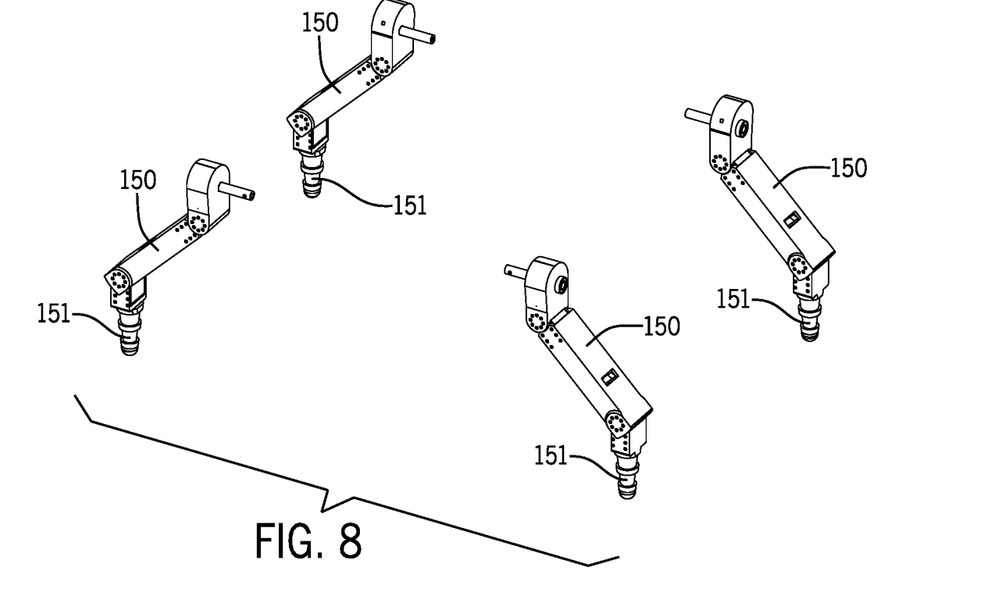
FIG. 8 illustrates a perspective view of the legs of the drone in an embodiment.

Referring now to the drawings, in an embodiment a drone 1 is provided. The drone 1 may have a top 2, a bottom 3, a front 4, a back 5, a first side 6, a second side 7 and a generally hollow interior portion 8 (FIG. 7). In an embodiment, the drone 1 may have a plurality of wings 10. The drawings illustrate the drone 1 with four wings 10; however, a greater or fewer number of wings 10 may be implemented in the drone 1. Removably attached to drone 1 may be propellers 11 and a propeller guard 12. Legs 150 may be secured to the bottom 3 of the drone 1. In an embodiment, the legs 150 have electrical contact points 151 and make electrical communication with electrical components on a charging pad. Further, the legs 150 may receive power from the charging pad to power the drone between flights.

Figure 13:
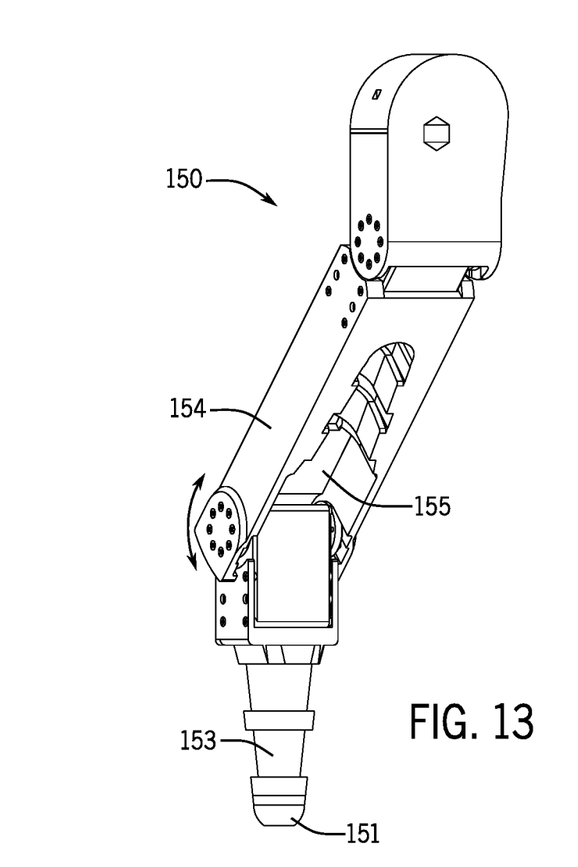
FIG. 13 illustrates a perspective view of a leg of the drone in a first position.
Figure 14:
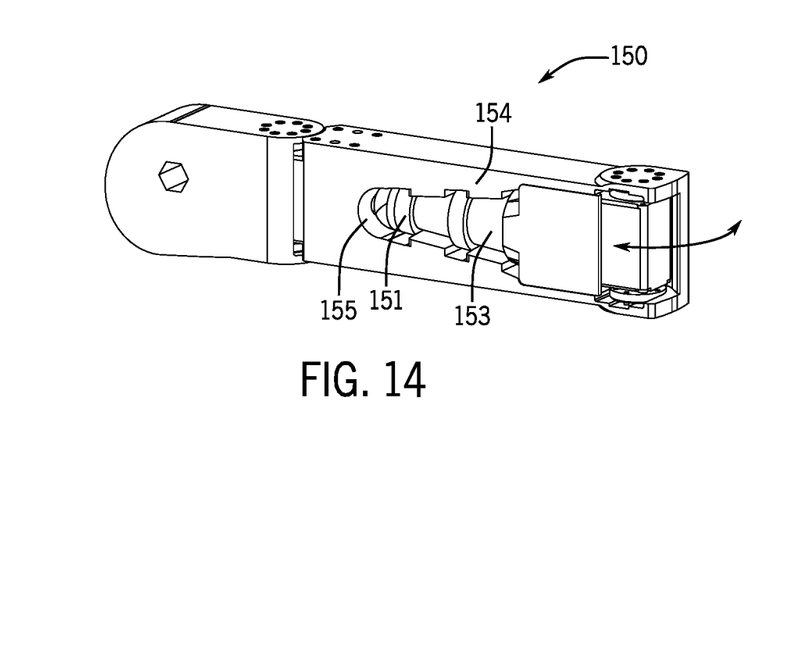
FIG. 14 illustrates a perspective view of the leg of the drone of FIG. 13 in a second position.

Referring now to FIGS. 13 and 14, in an embodiment, the legs 150 may each have a main body portion 154 having an indented portion 155 which is shaped similar to, but slightly larger than, the bottom unit 153 of the leg 150. In particular, the bottom unit 153 of the leg 150 may rotate at least one hundred and eighty degrees from a stored first orientation within the body 154 of the leg 150 (as shown in FIG. 14) to the second orientation shown in FIG. 13 for landing and powering the drone 1. While the drone 1 is in flight, the bottom unit 153 of the legs 150 rotate upward and into the main body 154 of the legs 150 to reduce drag. When the drone 1 is ready to land, the bottom unit 153 is rotated approximately one hundred and eighty degrees downward from the indented portion 155 so that the drone 1 can land. The tip 151 of the bottom unit 153 may be electrical and may be used to charge the drone 1 from a charging pad (not shown).

Figure 4:
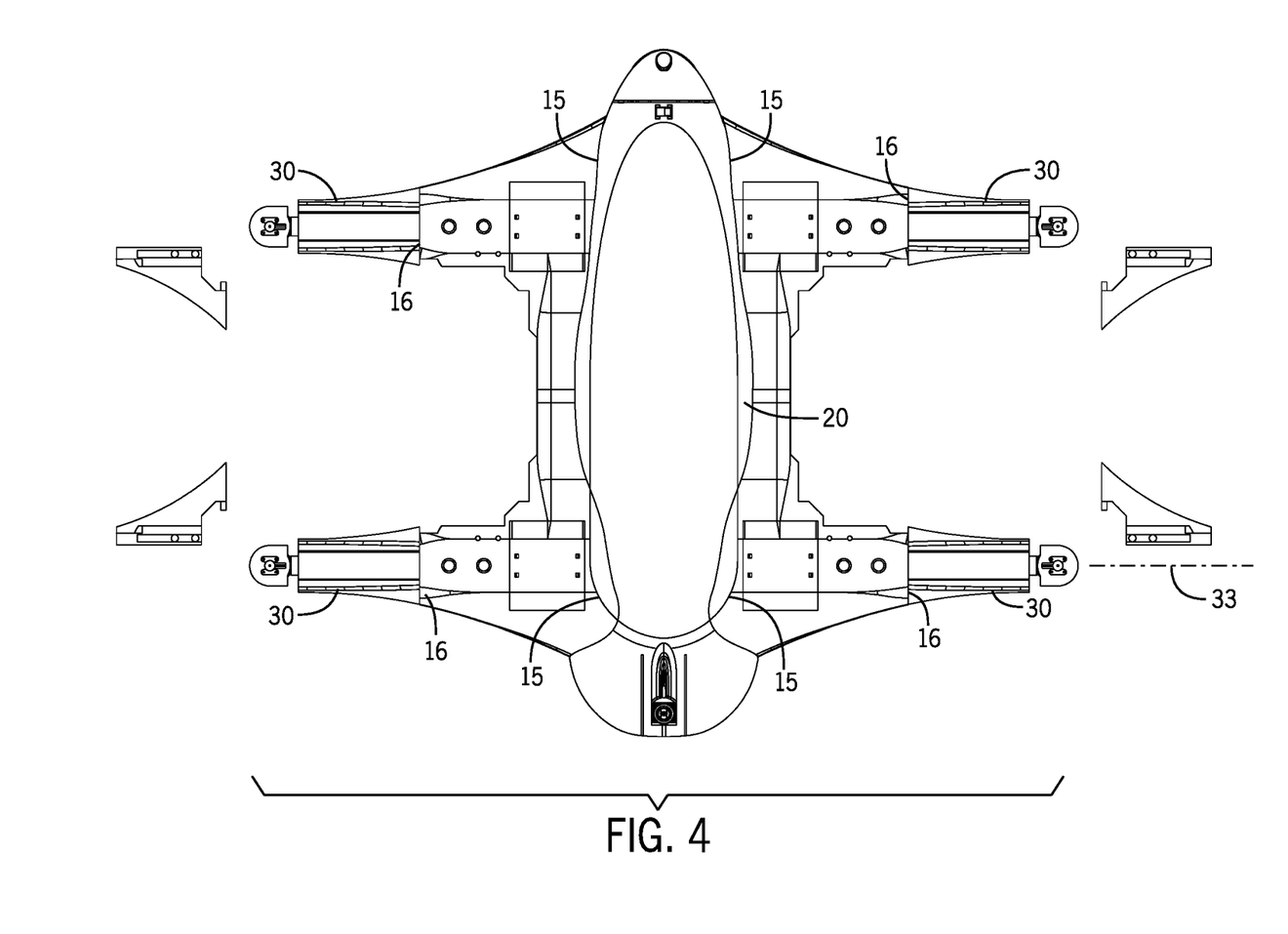
FIG. 4 illustrates an exploded view of the body of the drone wherein the wings are in the first orientation and wherein wing extension units are illustrated and are in the process of being attached to the wings.
Figure 5:
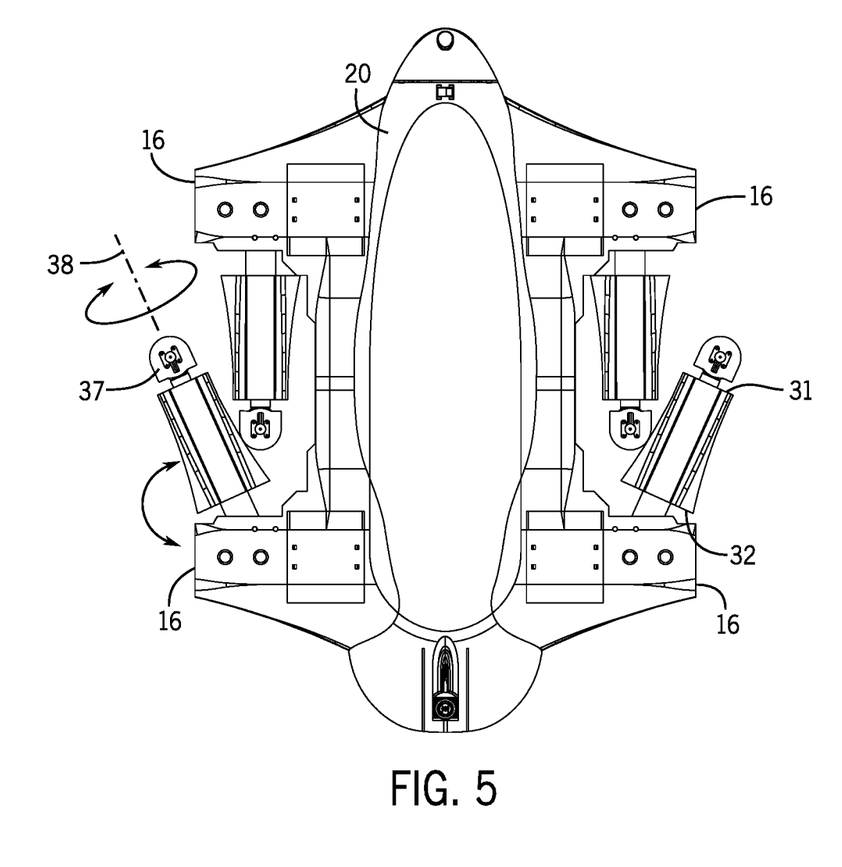
FIG. 5 illustrates a view of the body of the drone wherein the wings are in the second (or "folded") orientation.

Referring now to FIGS. 4 and 5, in an embodiment, the wings 10 may each have a proximal end 15 and a distal end 16. The proximal end 15 of the wings 10 may be secured to a main body 20 of the drone 1 and the distal end 16 of the wings 10 may be the portion of the wings 10 located away from the body 20 of the drone 1. Preferably, the wings 10 have a wider proximal end 15 than distal end 16 so that the wings 10 are somewhat triangular in shape, therein making the wings 10 more stable. A wing extension unit 30 may be attached to each of the distal ends 16 of the wing 10. In one embodiment, foldable and removable units (FIG. 4) (shown next to the wing extensions 30) may also be present. These foldable and removable units may further increase lift of the drone during flight.

The wing extension unit 30 may rotate from a first position (FIG. 5) to a second position (FIG. 4). In the first position, wing extension unit 30 is rotated to a position near the body 20 of the drone 1 to make the drone 1 more compact for storage and transportation. In the second position, the wing extension unit 30 may be rotated along a same axis 33 of the wing 10. In this second position (FIG. 4) the drone 1 may be flown.

Figure 19:
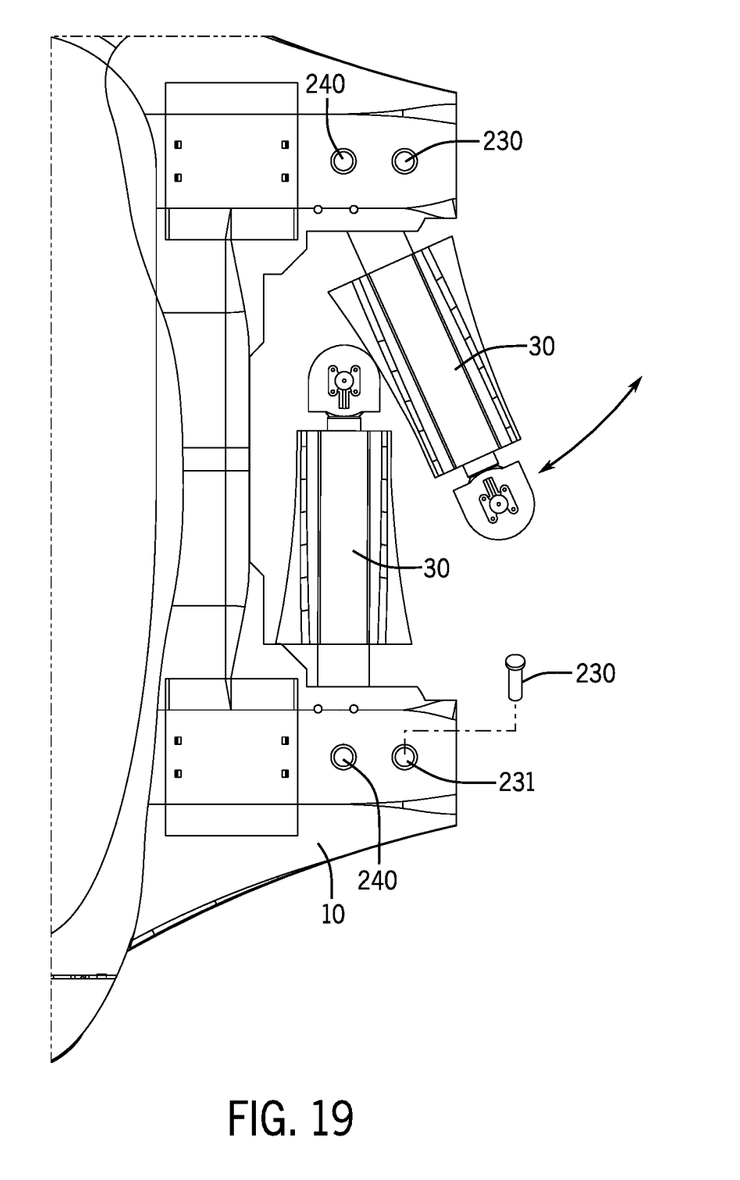
FIG. 19 illustrates the pin system of the wings of the drone in one embodiment.

In an embodiment, the wing extension units 30 may be rotated from the distal end 16 of the wings 10 by a locking pivot pin 230 (FIG. 19) located on the wings 10. In particular, a permanent first pin 240 may be located on the wing 10 and connected to the wing extension unit 30. The permanent first pin 240 may allow the wing extension unit to rotate approximately ninety degrees with respect to the wing 10. The permanent first pin 240 may not be removed from the drone 10. The locking pivot pin 230, may be attached or removed from the drone 1. The locking pivot pin 230, when inserted into an opening 231 on the wing 10 may prevent the wing extension unit 230 from rotating along the x-axis 33 with respect to the wing 10. When the locking pivot pin 230 is removed from the opening 231 of the wing 10, the wing extension units 30 may then be rotated with respect to the wing 10 (for example, rotating from FIG. 4 to FIG. 5). One locking pivot pin 230 may be associated with each wing 10. In an embodiment, both pins 230 and 240 are aluminum pins for increased strength and light weight performance.

The wing extension unit 30 may have a front 31 and a back 32. The back 32 of the wing extension unit 30 may be the end of the wing extension unit 30 that touches the wing 10 and the front 31 of the wing extension unit 30 may be located farther away from the main body 20 of the drone 1 than the back 32 when the wing extension units 30 are in the second position (FIG. 4). Located at the front 31 of the wing extension unit 30 may be a pivot unit 37 which rotates along an axis 38. As a result, the propellers 11 may be rotated as discussed below. The rotation is generated by servo motors located within the drone 1.

Figure 6:
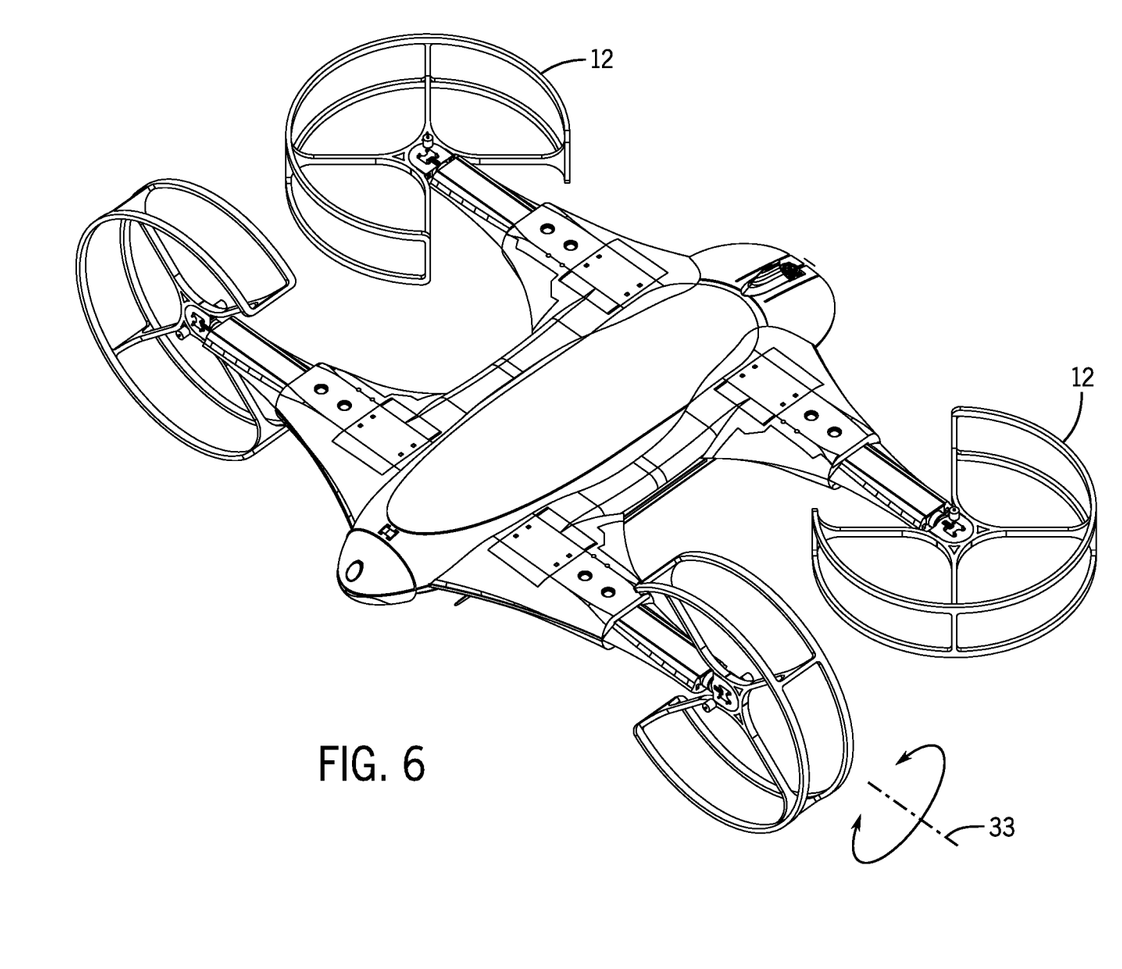
FIG. 6 illustrates a perspective view of the drone wherein two of the four wings of the drone are rotated along the wings x-axis.

FIG. 6 illustrates that the propeller guards 12 (and therein propellers 11 which are not shown in that figure) may rotate three hundred and sixty degrees around the x-axis 33. As a result, the drone 1 may very quickly maneuver in virtually any direction in a much faster maneuver than standard fixed propeller drones.

Figure 9:
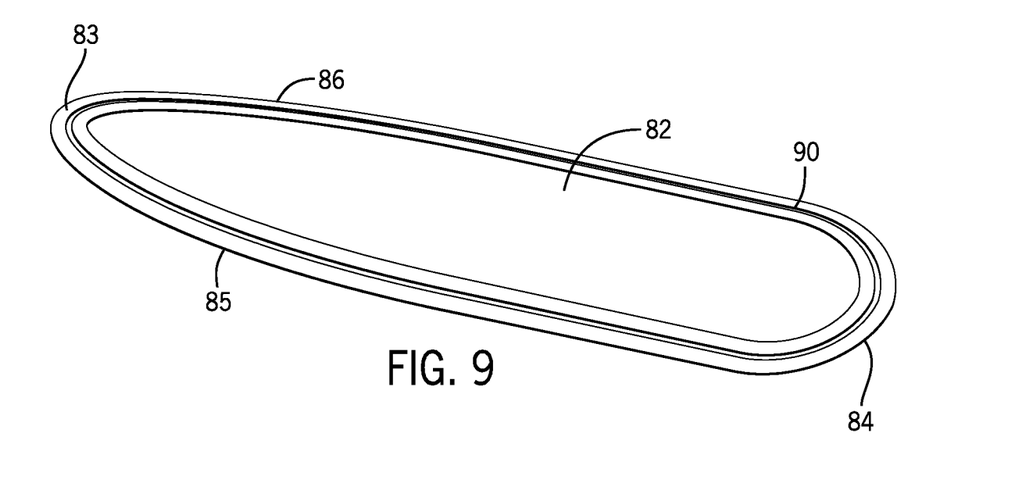
FIG. 9 illustrates a perspective view of the top panel of the drone.

Referring now to FIGS. 7 and 9, in an embodiment, the top 2 of the drone 1 may have a top panel 80. The top panel 80 may have a top surface 81, a bottom surface 82, a front 83, a back 84, a first side 85 and a second side 86. The top panel 80 may be inserted over an opening 100 of the drone 1 that exposes the interior portion 8 of the drone 1. As a result of the interior 8 of the drone 1 being substantially hollow, the drone 1 may be light weight and may receive an accessory 400 (as described below) and may help balance the drone 1 when the accessory 400 is secured.

In an embodiment, the bottom surface 82 of the top panel 80 may have a metallic strip 90 (or plate). The metallic strip 90 is preferably located at or near the outer perimeter of the top panel 80 (or may cover most of the panel if it is a plate). The metallic strip 90 may be magnetic and metallic and may allow for electrical contact and electrical communication with a second electrical strip 95 (which may also be magnetic) which surrounds the opening 100 of the top 2 of the drone 1. Allowing a user to quickly and easily remove the top panel 80 allows a user to quickly access electrical components 110 located within the interior 8 of the drone 1 to make modifications.

In one embodiment, the drone 1 may be a hybrid drone 1 utilizing both fuel tanks and rechargeable batteries during flight. In an embodiment, the metallic strip 90 (or plate) may be a copper plate which may provide electrical connection with electronics within the drone. As a result, the metallic strip 90 (or plate) may replace some or all wires within the interior of the drone to remove and reduce both weight and complexity of the electrical systems. As a result of the strip or plate, the perimeter of the top panel 80 is metallic allowing for an electrical connection between two or more components of the interior of the drone.

Figure 1:
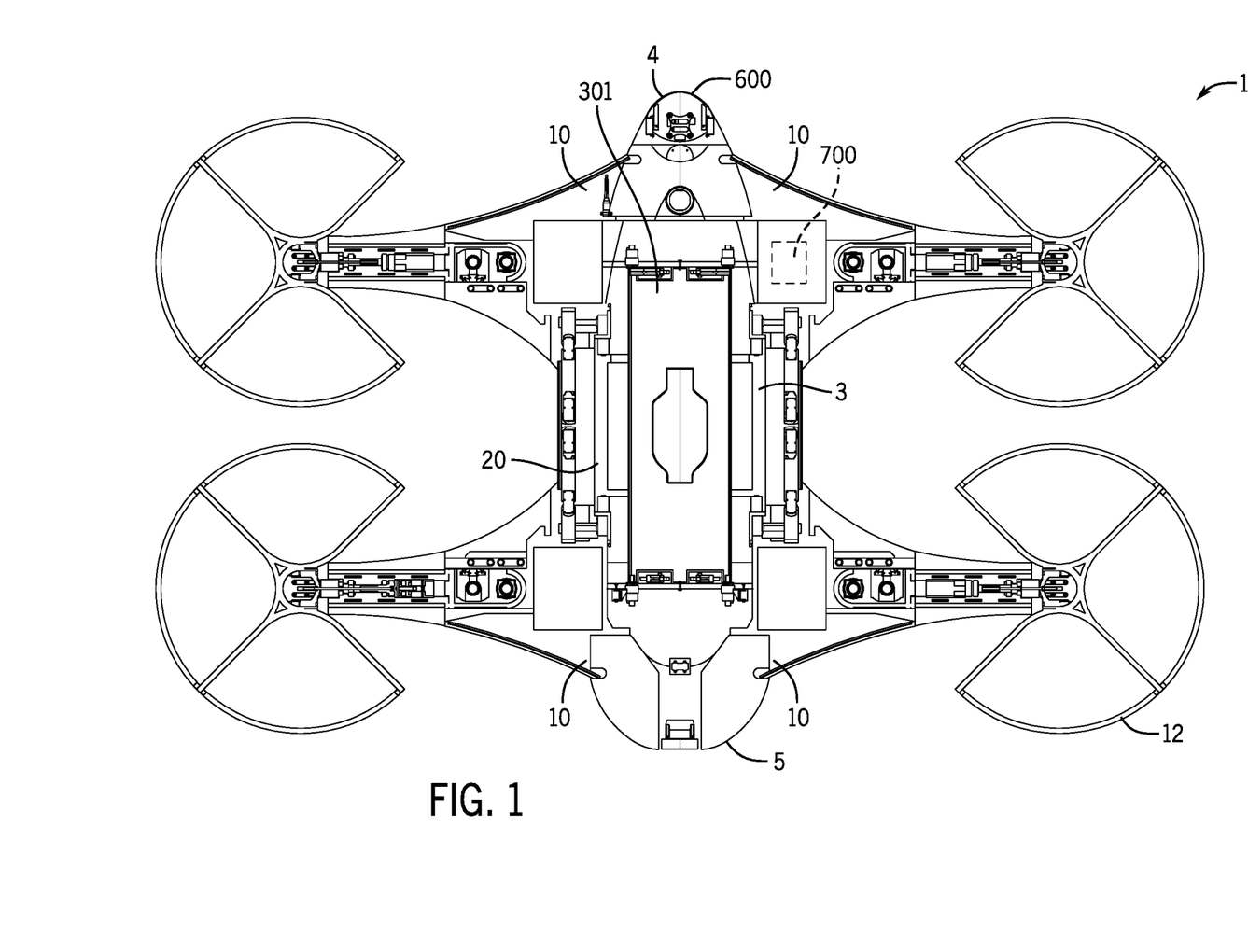
FIG. 1 illustrates a view of the bottom of the drone wherein the securing panel is visible and wherein the securing panel is secured to the drone.
Figure 2:
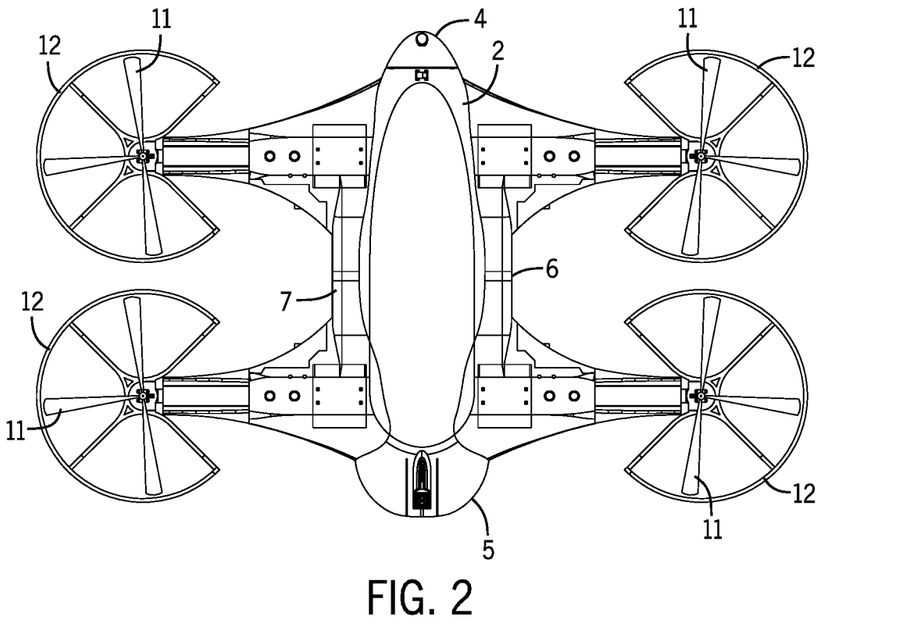
FIG. 2 illustrates a view of the top of the drone in one embodiment.
Figure 3:
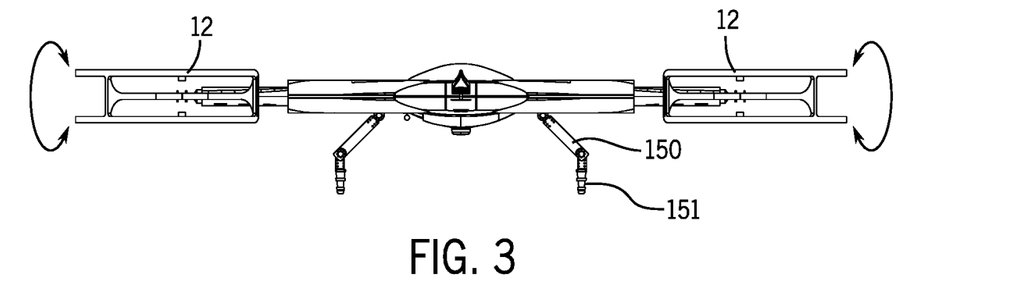
FIG. 3 illustrates a front view of the drone in one embodiment.
Figure 10:
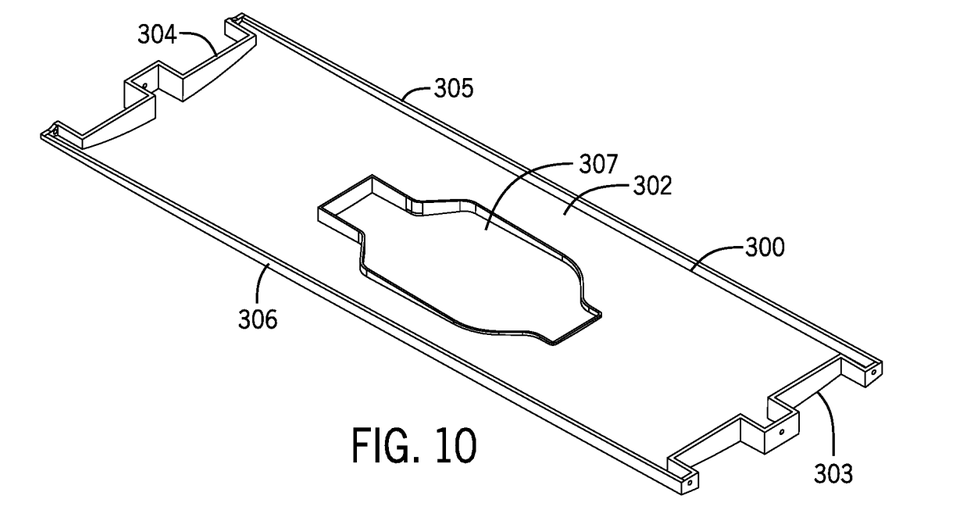
FIG. 10 illustrates a perspective view of the securing panel of the bottom of the drone in one embodiment.

In an embodiment, the drone 1 may have a securing panel 300 (FIG. 10). The securing panel 300 may have a top 301 (FIG. 1), a bottom 302, a front 303, a back 304, a first side 305 and a second side 306. An opening 307 may be located on the securing panel 300. In an embodiment, the securing panel 300 may be temporarily and removably secured to the bottom 2 of the drone 1.

Figure 11:
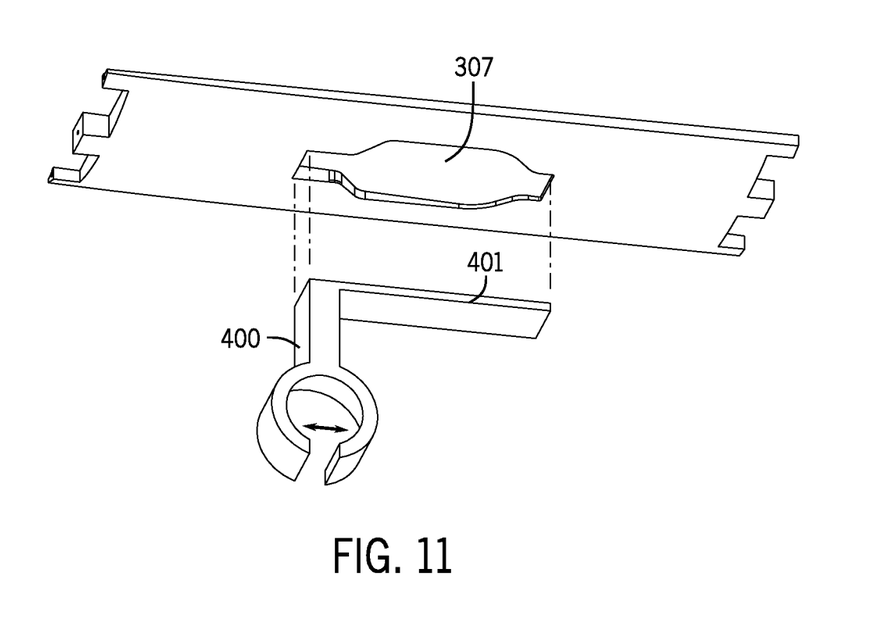
FIG. 11 illustrates one version of a tool (a gripping device) which may be inserted into the opening of the securing panel.

The opening 307 of the securing panel 300 may receive a tool or other object 400. FIG. 11 illustrates a grasping mechanism as the tool 400, but various other objects or tools 400 may be used in connection with the drone 1. The tool 400 may have a standardized hook 401 which is received within the opening 307 of the securing panel 300. As a result of the standardized hook 401, a wide variety of objects/tools may be used to connect to the drone 1.

Figure 12:
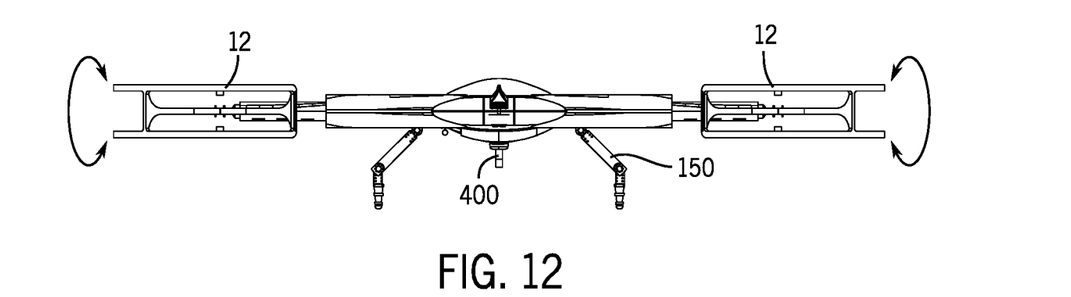
FIG. 12 illustrates a front view of a tool (a gripping device) actively secured to the drone.
Figure 17:
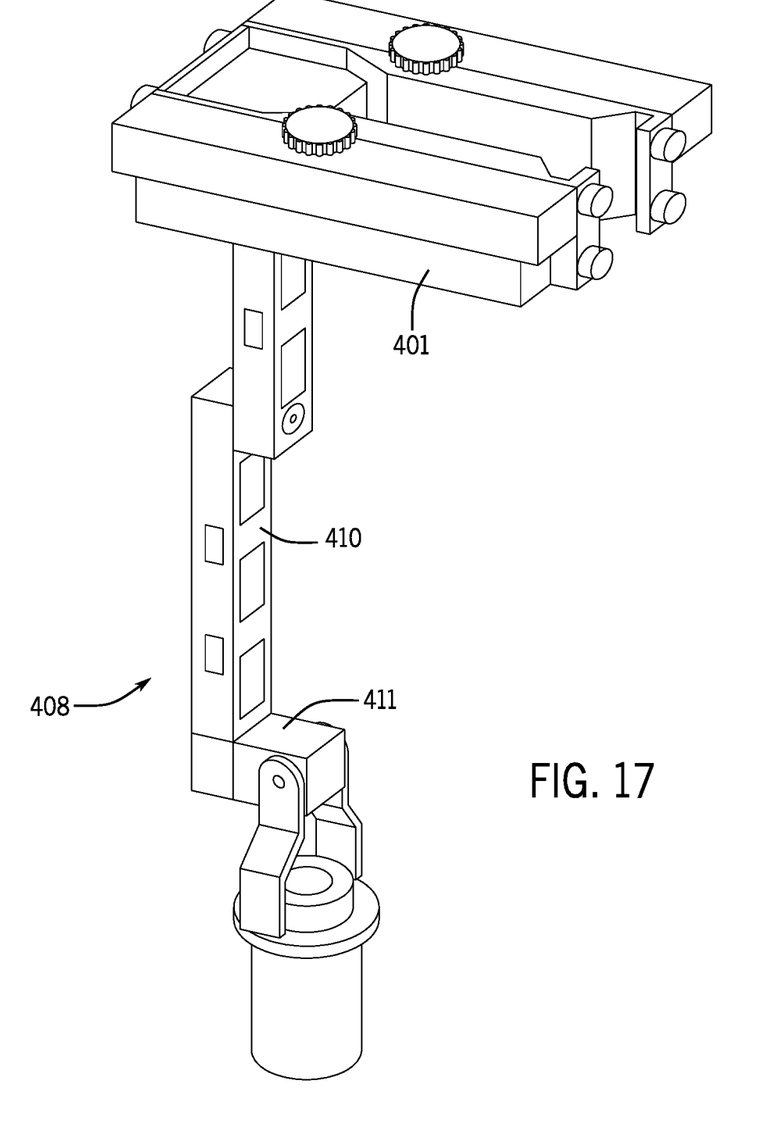
FIG. 17 illustrates one embodiment of an attachment that may be secured to the drone. The attachment in FIG. 17 is a spray mechanism for the drone, as may be used in farming.

FIG. 17 illustrates an alternative embodiment of the tool (or "accessory") 408 which may be attached to the securing panel 300 of the drone 1. The tool/accessory of FIG. 17 illustrates a sprayer, seeder, cutter or the like. The tool/accessory of FIG. 17 may be used to spray, for example, chemicals or water on a crop or may be used to spray seed on land. The tool/accessory of FIG. 17 may have, for example, multiple robotic arm units 410, 411 connected to a hook unit 401. In an embodiment, each unit may rotate or move with respect to each other so as to may allow the operator to accurately control the tool/accessory. FIG. 12 illustrates another alternative embodiment of a tool/accessory 400 secured to the drone 1. The tool/accessory 400 may be used to grasp and carry an object.

In an embodiment, as a result of the drone 1 having a largely hollow interior 8, a portion of the tool 400 (especially the hook 401) may be located within the interior body 8 of the drone 1 during use. As a result of locating a portion of the tool 400 inside the interior 8 of the body of the drone 1, the drone 1 is more properly balanced and stable during flight.

Figure 15:
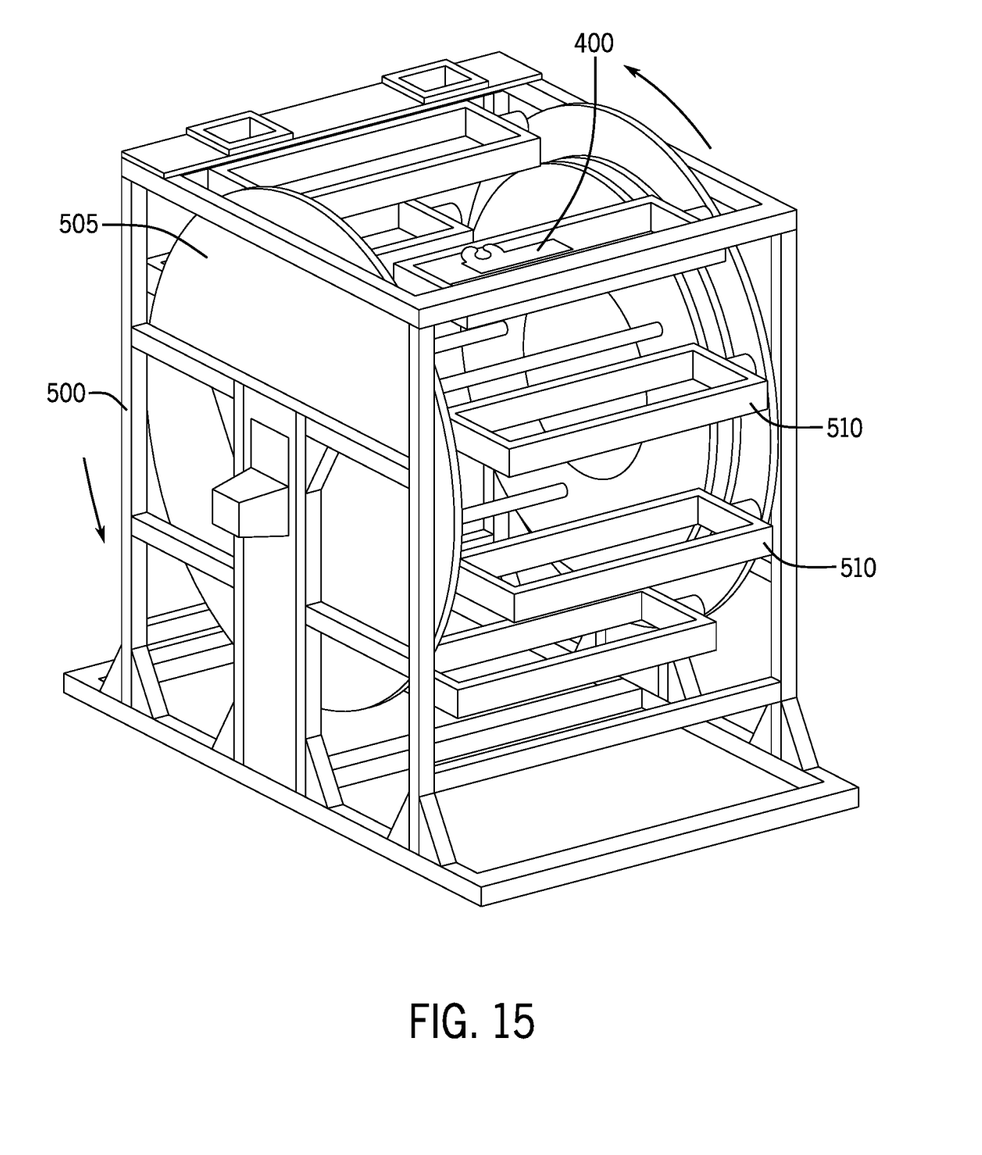
FIG. 15 illustrates a perspective view of the ground based rotating delivery unit with a plurality of pallets visible.
Figure 16:
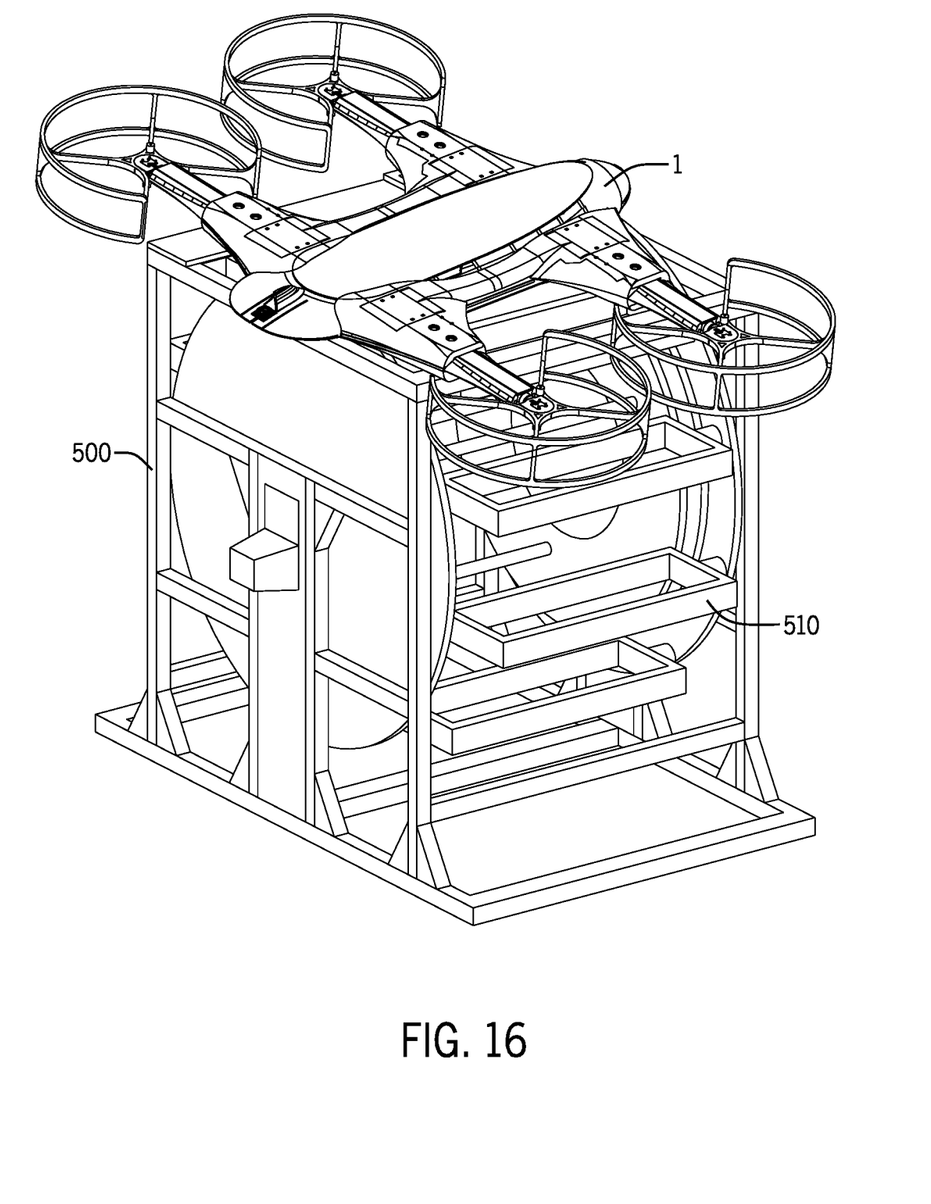
FIG. 16 illustrates the ground based rotating delivery unit of FIG. 15 wherein the drone has landed on the top pallet and is in the process of receiving or removing one of the various accessories for the drone.

Referring now to FIGS. 15 and 16, in an embodiment, the drone 1 may be used in connection with a ground based rotating delivery unit 500. The ground based rotating delivery unit 500 may have a wheel 505 which rotates along a central axle. The wheel 505 may rotate three hundred and sixty degrees around the central axle. Located on the wheel 505 may be a plurality of pallets 510. The pallets 510 may each contain, for example, a unique one of plurality of tools/accessories 400. FIG. 15 illustrates a grasping mechanism as the tool/accessory 400 located in a pallet 510. It should be noted that each pallet 510 may be loaded with a different tools/accessory 400 having a different function. As the user rotates the wheel 505 (including remotely), the user may select which tool/accessory 400 to secure to the drone 1 once the drone 1 hovers over and attaches to the ground based rotating delivery unit 500 (as shown in FIG. 16). More specifically, the drone 1 may hover over and/or land on the ground based rotating delivery unit 400 to swap out, pick up or drop off one of the tools/accessories 400 from the pallets 510 of the ground based rotating delivery unit 500.

Figure 18:
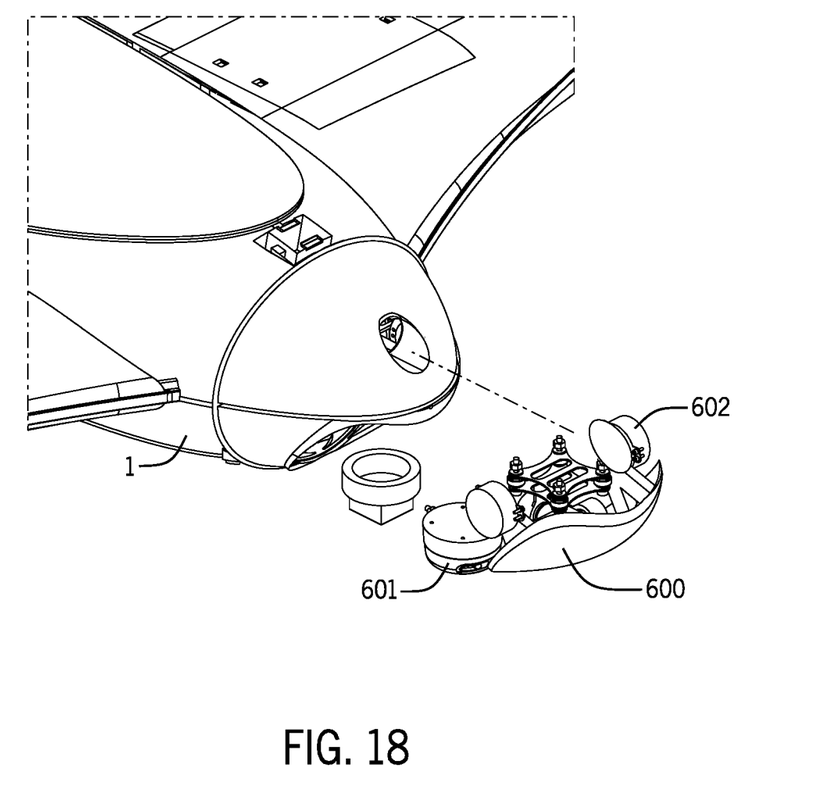
FIG. 18 illustrates the removable nose of the drone in one embodiment.

Referring now to FIG. 18, in an embodiment, the drone 1 may have a removable nose 600. The removable nose 600 may have, for example, at least a camera 601 and a sensor 602. Allowing the nose 600 to be removable from the drone 1 allows for the easily swapping out of the camera 601 and sensor 602 for alternative cameras 601 and sensors 602 having different functions and uses. The camera 601 may be, for example, a high-resolution camera. Because of the easily removable nose 600, an operator may quickly swap out the nose 600 as a single unit. In one embodiment, the nose 600 is attached to the drone 1 by magnets. In an alternative embodiment, a simple securing mechanism, such as a screw, is used to secure the nose 600 to the body of the drone 1. The nose unit 600 may also be loaded on the rotating pallet 510 of the ground based rotating delivery unit 500.

In an embodiment, each wing 30 of the drone 1 may have an optional parachute 700 (FIG. 1) compactly store within or on top of the wings to reduce damage if power is lost or the drone 1 disabled in some manner.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:
1. A drone comprising:
a main body having an interior;
a generally planar surface extending from the main body forming a wing connected to the main body;
a wing extension unit attached to the wing;
a first pivot pin inserted into the wing extension unit and passing into to the wing of the main body wherein the first pivot pin allows the wing extension unit to rotate with respect to the wing of the main body;
a second pivot pin removably inserted into the wing extension unit and passing through into the wing of the main body wherein the second pivot pin prevents the wing extension unit from rotating with respect to the wing of the main body;
wherein the wing extension unit may rotate with respect to the wing only if the second pivot pin is not inserted into the wing extension unit and the wing; and
a top of the main body wherein the top of the main body has a removal panel cover that exposes the interior of the main body and wherein the removal panel cover has a metallic perimeter that allows for electrical connection between electrical components located within the interior of the main housing.
2. The drone of claim 1 wherein the wing extension unit may rotate along a first axis with respect to the wing of the main body and may rotate along a second axis with respect to the wing of the main body.
3. The drone of claim 1 further comprising:
a propeller attached to the first wing extension unit.
4. The drone of claim 3 further comprising:
a guard at least partially surrounding the propeller.
5. The drone of claim 1 further comprising:
an axis of the wing wherein in a first position a wing extension unit axis and the wing axis are identical and a second position wherein the axis of the wing and the axis of the wing extension unit are not identical.

6. The drone of claim 1 further comprising:
a nose unit located at the front of the main body.

7. The drone of claim 6 further comprising:
a camera and a light located within the nose unit of the main body.

8. The drone of claim 6 wherein the nose unit is removably secured to the front of the main body.

9. The drone of claim 1 further comprising:
a bottom of the main body wherein the bottom of the main body has a securing mechanism and wherein the securing mechanism secures a removable tool.

10. The drone of claim 9 wherein the tool is a grasping mechanism.

11. The drone of claim 9 wherein the tool is a spraying mechanism for spraying a liquid.

12. The drone of claim 1 further comprising:
a leg located on a bottom of the main body wherein the leg has a first unit and a second unit.

13. The drone of claim 12 wherein the leg moves from a first position to a second position and wherein in the first position the first unit of the leg is folded into an opening of the second unit of the leg and wherein in the second position the first unit of the leg is not folded into an opening of the second unit of the leg.

14. The drone of claim 1 further comprising:
a leg wherein the leg has a bottom and wherein the bottom of the leg is metallic and may be electrically conductive.

\* \* \* \* \*